United States Patent [19]  
Way

[11] Patent Number: 5,013,232  
[45] Date of Patent: May 7, 1991

[54] EXTRUSION DIE CONSTRUCTION
[75] Inventor: Terrance Way, Flint, Mich.
[73] Assignee: General Motors Corporation, Detroit, Mich.
[21] Appl. No.: 531,620
[22] Filed: Jun. 1, 1990

Related U.S. Application Data
[62] Division of Ser. No. 399,184, Aug. 24, 1989, Pat. No. 4,955,524.

[51] Int. Cl.⁵ ............................................. B29C 47/30
[52] U.S. Cl. ........................... 425/192 R; 264/177.12; 425/461; 425/462; 425/464
[58] Field of Search ........... 264/177.1, 177.12, 177.11; 425/190, 192 R, 461, 462, 463, 464; 282/182, 189

[56] References Cited

U.S. PATENT DOCUMENTS

| | | | |
|---|---|---|---|
| 3,097,293 | 7/1963 | Frankhouser et al. | 219/137 |
| 3,599,471 | 8/1971 | Whitacre | 72/414 |
| 3,608,167 | 9/1971 | Safran et al. | 29/25.14 |
| 3,832,760 | 9/1974 | Scott, Jr. | 29/25.14 |
| 4,041,597 | 8/1977 | Folmar et al. | 29/423 |
| 4,043,500 | 8/1977 | Padden et al. | 228/175 |
| 4,163,641 | 8/1979 | Hulin et al. | 425/461 |
| 4,242,075 | 12/1980 | Higuchi et al. | 425/462 |
| 4,343,604 | 8/1982 | Minjolle | 425/192 R |
| 4,468,366 | 8/1984 | Socha, Jr. | 264/177.12 |
| 4,486,934 | 12/1984 | Reed | 29/163.5 |
| 4,550,005 | 10/1985 | Kato | 264/177.12 |
| 4,812,276 | 3/1989 | Chao | 264/177.12 |
| 4,830,598 | 5/1989 | Inoue et al. | 425/463 |

FOREIGN PATENT DOCUMENTS
62-110864 5/1987 Japan.  
715328 2/1980 U.S.S.R. .............. 264/177.1

Primary Examiner—Jay H. Woo  
Assistant Examiner—Khanh P. Nguyen  
Attorney, Agent, or Firm—George A. Grove

[57] ABSTRACT

In accordance with a preferred embodiment, a monolith extrusion die is formed by a plurality of individual tube elements bonded together as a tube stack defining a plurality of extrudable material feed holes and reference guides for a plurality of individual shaping teeth each having a root segment located in a reference guide and each having a shaping head spaced apart from adjacent shaping heads to form intersecting rows of extrusion slots having a shape corresponding to the monolith formed by extrudable material directed from the feed holes through the shaping teeth. The method of the present invention includes stacking individual tubes into a tube stack with reference guides therein and with feed holes therethrough and locating a plurality of individual shaping teeth in the tube stack for forming a transition path for flow of extrudable material from the feed holes while forming intersecting rows of extrusion slots shaped to correspond to the monolithic honeycomb structure formed by passage of extrudable material therethrough.

5 Claims, 3 Drawing Sheets

EXTRUSION DIE CONSTRUCTION

This is a division of application Ser. No. 07/399,184 filed on Aug. 24, 1989 now U.S. Pat. No. 4,955,524.

This invention relates to extrusion dies for ceramic material or the like and to a method for manufacturing such dies. More particularly, it relates to a method of making extrusion dies of the type used in making ceramic monolithic honeycomb articles, such as those used in the catalytic treatment of automotive exhaust gases.

BACKGROUND OF THE INVENTION

Monolithic bodies having longitudinal through passages are produced by forcing an extrudable plastic mixture of ceramic material through interconnecting die passages in which the extrudable material is shaped and coalesced into a structure of intersecting, relatively thin walls that define the passages of a honeycomb structure having a cell density which is established by the number of passages formed through a cross section of a unit of the honeycomb structure. In one application, the material is a mixture of materials, such as clay, talc and alumina, that can be fired to form cordierite or other heat-resistant ceramic.

The main purpose of such honeycomb-type structure is to provide an extended surface area for exhaust gases to pass over. The surface area is increased by increasing the cell density, e.g., the number of cells per square inch through which the exhaust can flow. At the same time, it is usually necessary to form thinner cell walls of uniform thickness.

In certain cases the monolith consists of many longitudinal passages, as many as 400 per square inch of cross section of the monolith. In the extrusion process a wet or green ceramic precursor mixture of a suitable length is formed. It is directed through an extrusion die to form a resultant honeycombed green extrusion. The extrusion is sliced cross ways to form several pieces which are dried and fired to form the monolith substrate. The internal walls of the substrate are then coated with a noble metal catalyst finely dispersed on a suitable wash coat. Such honeycombed substrates are oval or elliptical in cross-section, and the individual cell cross-section is usually generally of square cross-section. The greatest dimension of the overall cross-section can be on the order of six inches, and the length to the monolith can be about six inches The cell dimensions, however, are several orders of magnitude smaller, e.g., in the range of 0.044 inch square at the cell hole and with cell wall thicknesses on the order of 0.006 inch. In order to extrude monoliths of this magnitude cell size at desired densities on the order of 400 cells per square inch and uniformly thin wall thicknesses, it is essential that the extrusion die be a precision die.

An example of such a die is set forth in U.S. Pat. No. 4,486,934 issued Dec. 11, 1984 to James R. Reed. The Reed design represents a common prior art extrusion die which, while suitable for its intended purpose, is of a configuration and is made by a method which is very complicated to form when bodies having 400 cells per square inch are to be extruded therethrough. Use of known precision machining methods to form such high cell density thin wall extrusion paths in prior art extrusion dies involves considerable expense and difficulty.

SUMMARY OF THE INVENTION

Accordingly, one feature of the present invention is to provide a simplified extrusion die which eliminates the need to form die slots by precision machining techniques.

Another feature of the present invention is to provide an extrusion die construction from individual feed tubes and shaping teeth arranged to form an extrusion slot pattern capable of extruding monolithic honeycomb structures having 100 to 600 or more cells per square inch and with cell wall thicknesses on the order of 0.006 inch.

Another feature of the present invention is to provide for such extrusion dies made from individual components including tube elements, spacer elements and shaping teeth joined together to feed extrudable material and to shape it into a monolithic honeycomb having a cell density from 100 to 600 cells per square inch.

Another feature of the present invention is to provide a simplified extrusion die for forming monolithic honeycomb structures of the type described in the preceding objects wherein the die comprises a stack of individual tube elements defining extrudable material feed openings and reference surfaces for precision location of a plurality of shaping teeth with heads thereon configured to define an extrusion slot with intersecting rows for shaping the extrudable material into a honeycomb structure.

Still another feature of the present invention is to provide a method for manufacturing an extrusion die for honeycomb structures including a feed section and a forming section and wherein both the feed section and the forming section are constructed from individual elements by a method which includes the steps of first joining individual tube elements to form the feed section and thereafter the step of locating a plurality of shaping teeth in the joined tube elements to form an extrusion slot with intersecting rows for shaping the extrudable material into a honeycomb structure of high cell density.

Another feature of the present invention is to provide a method of the preceding paragraph wherein the individual tube elements are joined as a stack and wherein the method includes the steps of non-contact finishing the ends of the stack without forming burrs on the ends of each of the stacked tubes.

BRIEF SUMMARY OF THE INVENTION

In accordance with a preferred embodiment of my invention, these and other features, objects and advantages are accomplished as follows. An extrusion die is provided with a feed section having a stack of tubes with abutting sections and spaced sections which are maintained in a spaced relationship by lengths of spacer wire which have a diameter less than that of the stacked tubes and of a shorter length. The spaced tubes have interstices formed at one end thereof defined by reference surfaces for seating the shank portion of individual shaping teeth. Individual shaping teeth are supported with respect to each of the reference surfaces to precisely locate shaping surfaces on the head of each of the teeth to form a plurality of intersecting rows of extrusion slots. The tubes form feed holes which discharge into a transition path at one end of the located shaping teeth. The transition path directs extrudable material from the feed section into the intersecting rows of extrusion slots to form a monolithic honeycombed structure with a high density cell pattern corresponding to the shape of the intersecting rows. The extrusion die is capable of extruding a ceramic monolith of 400 cells per square inch. In one example, the shaping teeth have square heads and the individual teeth are located on 0.050 inch centers located in a square pattern. The tube members are stainless steel tubes of 0.050 inch OD with a wall thickness of 0.002 inch (the resultant ID equals 0.046 inch). The tube members can be any length. In this example, they preferably are 0.750 inch in length. If the tubes and teeth are connected by brazing, the parts may be provided with an electrolytically applied copper plate, e.g., 0.0005 inch thick.

The method of the present invention includes the steps of stacking the tube members in a V-block fixture to form a square pattern of tubes stacked on each other and bonded together. The forming section of the extrusion die is then constructed by locating individual shaping teeth on one end of the tube stack to form a transition flow path from the feed section and to form intersecting rows of openings which have a shape corresponding to the shape of the honeycomb structure of the extruded monolith.

Other objects and advantages of my invention will be more fully understood from a detailed description thereof when read with reference to the following drawings in which:

DETAILED DESCRIPTION OF THE PRESENT INVENTION

Figure 1:
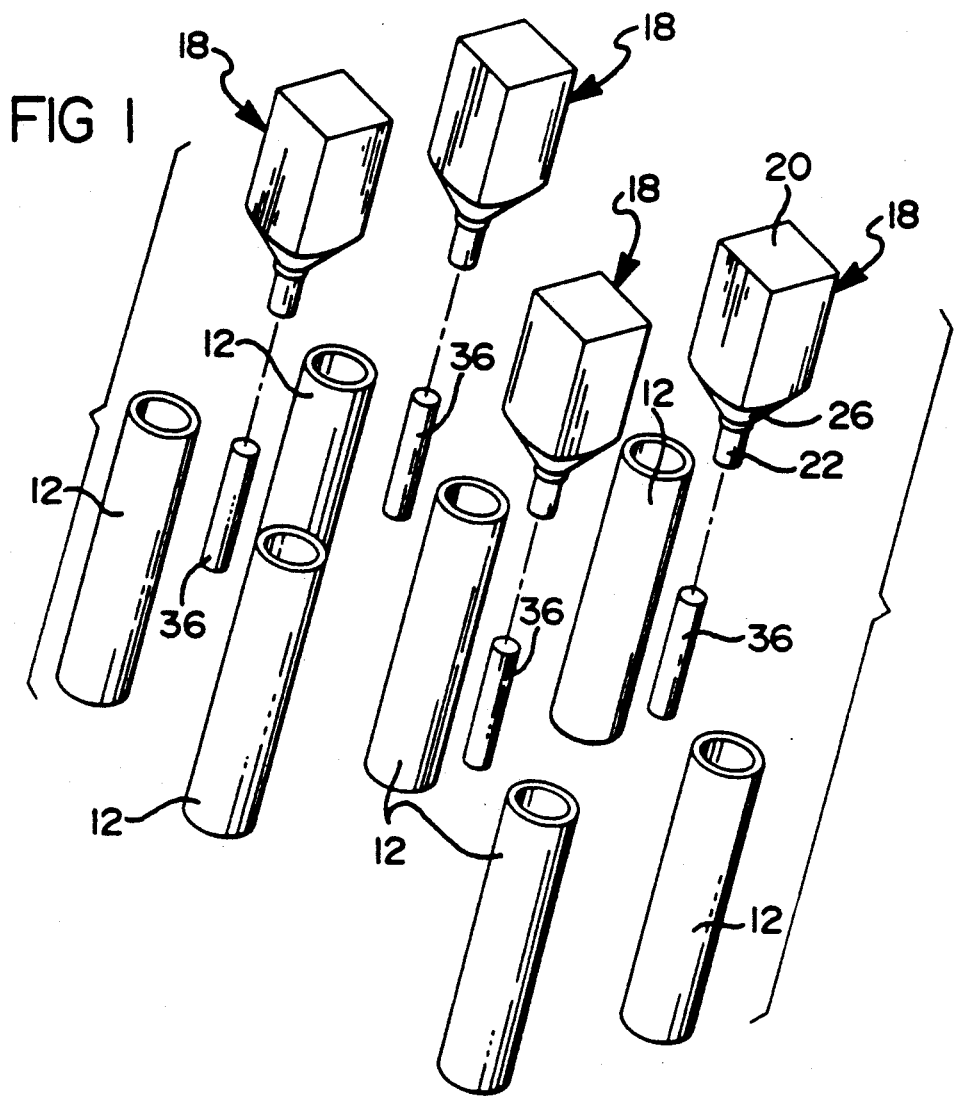
FIG. 1 is a perspective, exploded view of a portion of an extrusion die in accordance with the present invention.
Figure 2:
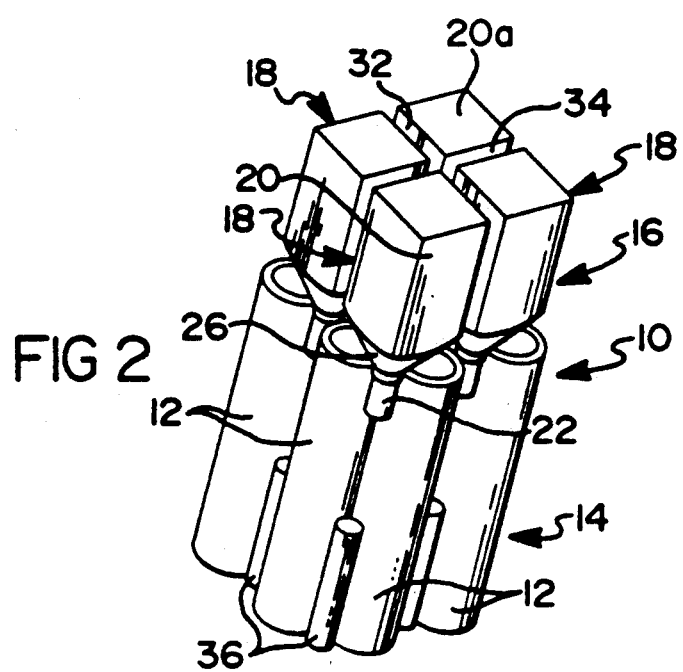
FIG. 2 is a perspective view of a portion of the extrusion die of FIG. 1 with the parts thereof joined.

Referring now to FIG. 1 and FIG. 2, a portion of a representative monolith extrusion die is depicted generally by reference numeral 10. It is seen as comprising a plurality of tube members 12 forming a feed section 14. The feed section is connected to a forming section 16 comprised of a plurality of shaping teeth 18 formed from cold drawn wire having the desired shape as will be discussed.

Figure 3:
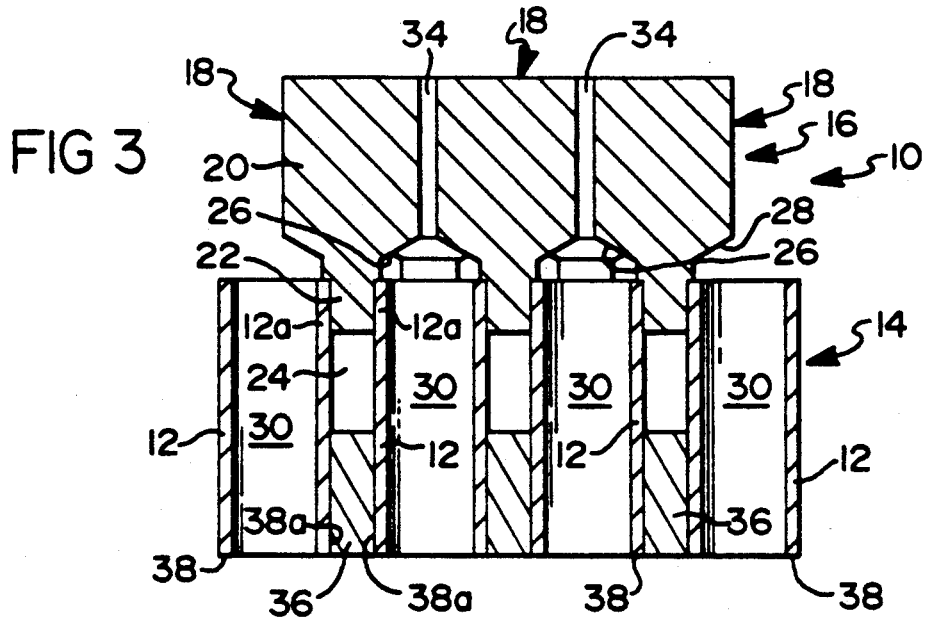
FIG. 3 is an enlarged sectional view taken along the line 3—3 of FIG. 4 looking in the direction of the arrows.
Figure 4:
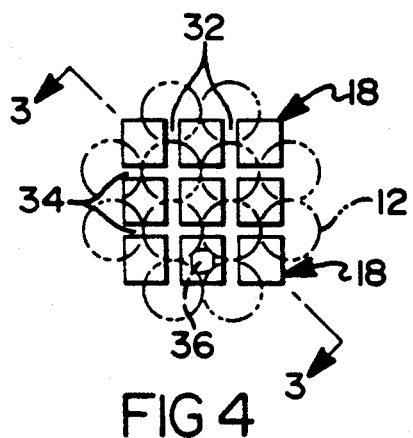
FIGS. 4–6 are fragmentary end elevational views of extrusion dies with different head shapes and different feed hole patterns.

More particularly, each of the tube members is a stainless steel tube having a length of 0.750 inch, an OD of 0.050 inch and a wall thickness of 0.002 inch (i.e., an ID of 0.046 inch). The teeth 18 are shown as having a square head 20 and a round shank 22. The shanks 22 are seated in interstices 24 formed between the tube members 12 as best shown in FIG. 3. The interstices 24 are defined by tube wall segments 12a which form reference surfaces for the shanks 22 to accurately align the square heads 20 of the teeth 18 on preselected centers, which in the illustrated embodiment are on 0.050 inch centers located in a square pattern.

Each of the shaping teeth 18 also has an annular sloping surface 26 thereon which is located above the outlet end of each tube member 12. The sloping surfaces 26 form a transition path 28 for flow of extrusion material from the feed holes 30 of each of the tube members 12 to extrusion slots which are formed by the square heads 20 as intersecting rows of extrusion slots 32, 34.

Additionally, the feed section 14 includes spacers in the form of wire pins 36 located between four of the tubes 12 at the inlet end 38 thereof and engaged with the external wall segment 38a at each end. The wire pins 36 thereby maintain the tube members 12 in spaced parallelism with one another to define an array of reference interstices 24 which will accurately position the shaping teeth 18 with respect to the feed section 14. Accordingly, wet ceramic material directed through the feed section will be forced through precision aligned extrusion slots 32, 34.

Each of the tubes 12, teeth 18 and pins 36 are coated with suitable bonding material, e.g., copper braze alloy or a suitable epoxy adhesive, which bonds the components together as a unitary extrusion die 10.

One feature of the present invention is that the use of separate tube members 12 and separate shaping teeth 18 enables the extrusion die 10 to be manufactured without time-consuming machining techniques. The above characterized extrusion die 10, when worn, can be replaced at relatively reduced cost because its individual parts are readily assembled by use of relatively low cost components joined together by use of simplified tooling and assembling techniques.

Figure 11:
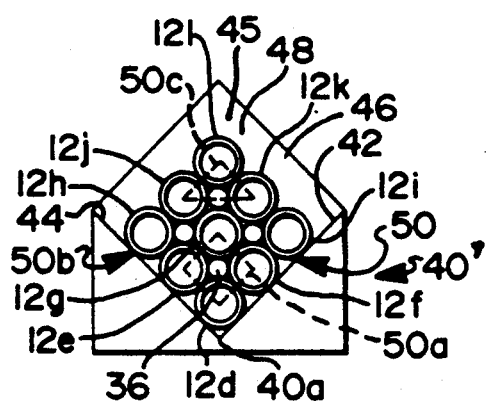
FIG. 11 is an end elevational view of a tube stack in the V-block of FIG. 9.
Figure 13:
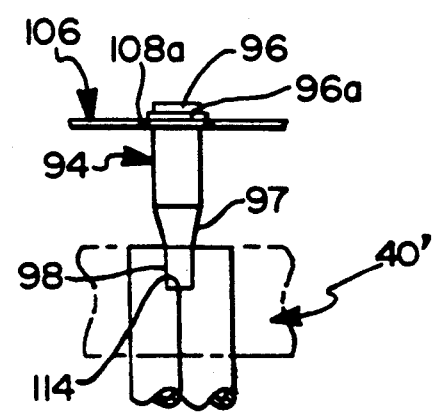
FIG. 13 is an enlarged fragmentary side elevational view of the wire grid fixture with a shaping head therein.
Figure 9:
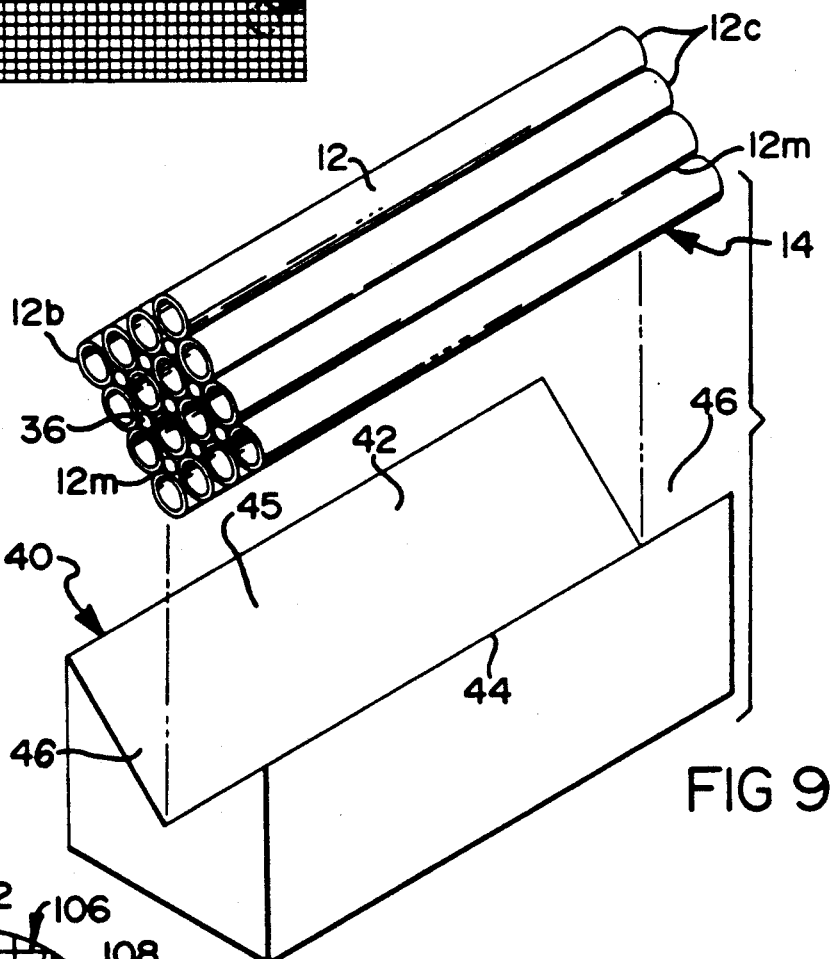
FIG. 9 is a perspective o f a V-block used in one embodiment of the method of the present invention.

One embodiment of the method of the present invention includes the steps of assembling a feed section 14 by stacking copper-plated tube members 12 in a V-block tool 40, e.g., a graphite block having two surfaces 42, 44 thereon arranged at right angle to one another, shown in FIGS. 9 and 11 (40' in FIG. 11). The surfaces 42, 44 define a tube support guide which has an opening 45 at the top thereof and openings 46 at the ends thereof through which the tube members 12 and spacer pins 36 can be stacked in alignment with each other.

Specifically, the method includes a step-by-step stacking of the tube members 12 and spacer pins 36 into the tool 40 to form a tube and spacer stack 50. The illustrated stack 50 includes a first stack group 50a formed by tube 12d being placed at the apex 40a of the support tool 40. Then, second and third tubes 12e, 12f are placed in the support tool 40 along with a spacer pin 36 and then a fourth tube 12g is added to complete the first stack group 50a. A second stack group 50b includes the addition of tubes 12h and 12i on either side of the tube 12g along with spacer pins 36 to form a third row of stacked tubes as viewed in FIG. 11. The stack 50 is completed by stacking three more tubes 12j,k,l in the V-block tool 40 in a stack group 50c to complete a feed section 14 of square form. The tubes are self centered one to t he other as they are stacked. The illustrated stack 50 has the outmost tubes 12 arranged with their center lines on the corners of a square. In one embodiment, the copper plating alloy material can be replaced by a coating of a curable adhesive material which will tend to stick the tubes together in their assembled position prior to bonding by the cured adhesive, e.g., epoxy adhesive material. If brazing coatings are employed, the stack 50 prior to bonding must be carefully handled to prevent the upper tube members of the stack from rolling into a more stable triangular configuration represented by the first and second stack groups 50a and 50b. In fact, a temporary transient glue could be used to temporarily fix the tubes until brazing occurs.

The V-block support tool 40 and the braze alloy coated version of the stack 50 are placed in a vacuum furnace and brazed with the copper plating serving as a brazing alloy to rigidly join the relatively supported and centered tube members 12. The spacer pins 36 and line contacts 12m between each of the tubes 12 will produce accurately defined reference surfaces around each of the interstices 24 for receiving the shaping teeth 18.

If necessary, the opposite aligned ends 12b, 12c of the tubes in the tube stack 50 can be further finished to assure that the tube ends 12b, 12c will be parallel. Tubes can also be stacked to form a flat face by using a temporary backing plate (48 in FIG. 11) and seating each tube back against the temporary plate. One suitable finishing step is to direct rotating non-contact machine heads, i.e., the electrode of an electrical discharge machining apparatus, to remove the ends of the tubes along a precision plane. Such finishing of the tube ends is preferred since it will produce desired burr-free parallel surfaces in the resultant unitary extrusion die for accurate placement in an extrusion assembly.

The copper-plated teeth 18 then have their shanks 22 inserted into the interstices 24 which serve to align the square heads 20 thereon to form the forming section 16. The assembled teeth 18 and the previously bonded feed section 14 is placed in a vacuum furnace and brazed to form the resultant extrusion die 10 of the present invention. If desired, the exposed end of the forming section can be further finished by machining the ends 20a thereof by use of a suitable finishing technique which will maintain the opposite end surfaces of the die in spaced parallelism so that the die 10 will properly seat in associated extruding equipment. One such technique is use of a rotating electrode of an electric discharge spark erosion machine which is directed across the ends 20a to form a parallel surface without forming burrs on the edges of the shaping heads 18. Consequently, the intersecting extrusion slots 32, 34 will have their exact dimensional form preserved throughout the assembling and finishing steps of the present invention.

The finished extrusion die 10 is then placed in a suitable die holder with appropriate masking to prevent damaging the precisIon shape of the feed holes 30 or the extrusion slots 32, 34 prior to extruding the extrudable material.

Figure 7:
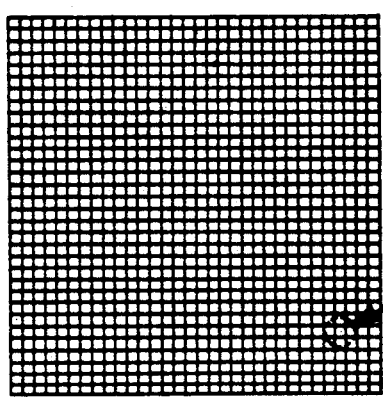
FIG. 7 is a fragmentary view of a honeycomb structure formed by the extrusion die of the present invention.
Figure 8:
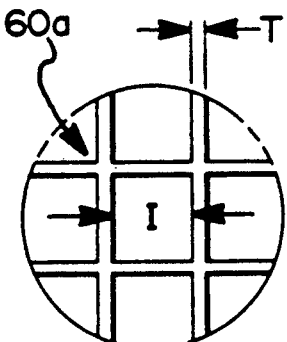
FIG. 8 is an enlarged fragmentary view of a single cell segment of the honeycomb structure.

The importance of the precision assembling method and resultant die construction of the present invention is best understood when it is recognized that the holes and slots form a ceramic monolith substrate with a cell density on the order 400 cells per square inch and wall thicknesses of 0.006 inch. The resultant scale of such a monolith is shown near scale in the fragmenlary end section 60 shown in FIG. 7. FIG 8 shows a blown-up section 60a of one of the cells. It has a wall thickness T of 0.006 inch and an internal wall dimension I of 0.044 inch per side. It is manifestly clear that such dimensional shapes are only attained by use of precision die constructions.

Use of the assembling methods of the present invention enables precision dies to be quickly formed by use of simple tooling and assembly techniques rather than costly and laborious steps of precision machining. Hence the invention reduces the cost of initial tooling and the cost of replacement tooling requirements when tool life is reduced because of high throughput.

Figure 5:
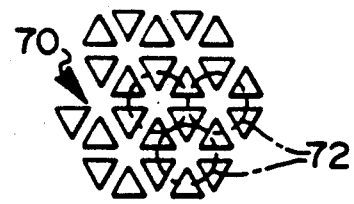
Figure 6:
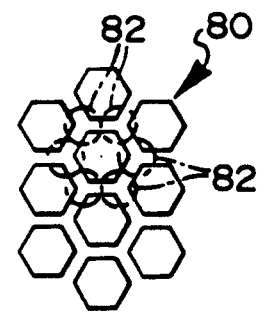

The apparatus formed by the aforedescribed method can be formed from various shaping heads other than the illustrated square configuration. Also, various transition paths can be easily formed between the feed section and the forming section only by varying the pattern of the feed holes which direct extrudable material to the intersecting rows of extruding slots. Thus, as shown in the embodiment of FIGS. 1–4, the feed holes 30 are located with respect to square teeth so that the feed hole pattern includes a feed hole at each slot intersection. In FIG. 5, the forming section is formed by use of shaping teeth 70 having triangular form. In the FIG. 5 embodiment, the feed holes 72 are located to accommodate a triangular-shaped tooth. In FIG. 6, the forming section is comprised of shaping teeth 80 having a hexagonal shape 80, and the feed holes 82 thereto are located to accommodate such shaped teeth.

In each of the aforesaid embodiments, the different tooth shape will produce a different form of cell shape in the resultant monolith formed by the extrusion die. The cell shape change is easily accomplished merely by switching the shape of the tooth and the tube stacking sequence used in a particular design. If required, in all cases, at the end of the assembly process, any space remaining between the tubes and spacers (or the tubes if spacers are omitted) may be filled with epoxy resin of other material so that the extrudable material flows only through the feed holes of the tubes for distribution through the desired distribution pattern into the extrusion slots for formation thereby into the finished monolith honeycomb shapes.

In another embodiment of the method of the present invention, tubes 12 are placed loosely in a V-block holder. The tubes are of the same form and material as in the first embodiment. However, if greater die strength is required, the length of the individual tubes can be increased. The tubes 12 are stacked loosely in the V-block holder 40' as described in the preceding embodiment. In this embodiment, the tubes 90 remain loosely stacked until shaping teeth 94 are precisely aligned one to the other by a fixture which will hold the teeth 94 in a fixtured location. In the present case, teeth 94 are shaped as a pIn having a square head portion 96, a transition land 97 and a round shank 98.

Figure 12:
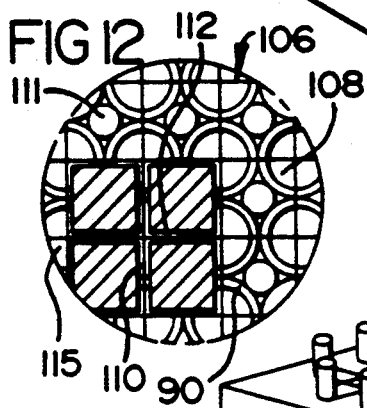
FIG. 12 is an enlarged fragmentary top elevational view of the wire grid fixture of FIG. 10.
Figure 10:
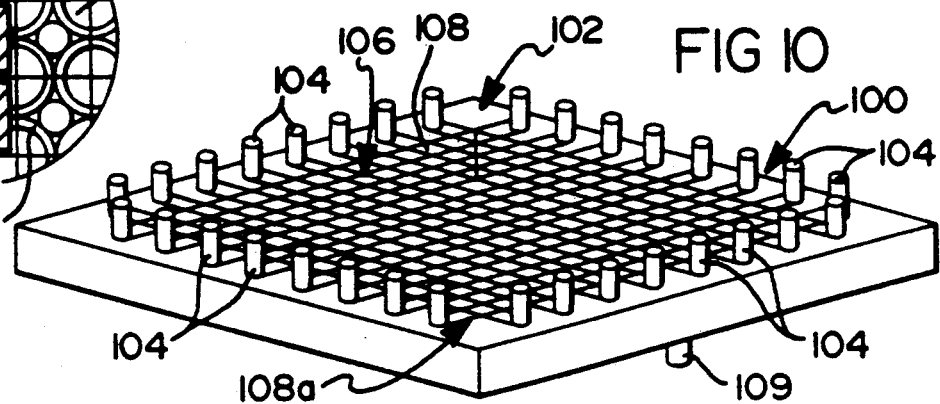
FIG. 10 is a perspective view of a wire grid fixture used in another embodiment of the method of the present invention.

In this embodiment of the method of the present invention the fixture for locating the teeth 94, as best seen in FIGS. 10 and 12, is in the form of a locator assembly or fixture 100 having a hollow, square frame 102 having a plurality of spaced pins 104 secured thereto. Each of the pins 104 extends outwardly of the frame for defining reference points about which a wire grid 106 is wound. The wire grid 106 can be formed by wrapping a continuous wire around the pins 104 or can be formed by securing individual wires with the aide of a coordinate measuring machine.

The wire grid 106 has rows of openings 108 shown enlarged in FIG. 8 which are located with respect to the tubes 90 by dowels 109 which connect between the square frame 102 and the V-block holder 40'. The shaping teeth 94 are then inserted one by one in the wire grid 106 to produce an exact pattern of the teeth 94 with precisely formed intersecting rows 110, 112 of extrusion slots. The wire grid 106 assures the proper orientation of the square heads 96.

Once the tube and tooth structure has been built up to a desired size, it is either allowed to stand for curing of the epoxy adhesive or it is carefully placed in a brazing furnace including teeth, wire framework and tubes where the parts are joined into a unitary extrusion die like the die 10 of first embodiment but with slightly different shaped teeth. If the assembly is brazed, the teeth and the top portion 96a of each tooth 94 and the wire mesh 106 is removed from the assembly by suitable machining techniques, e.g., electrical discharge machining by spark erosion to expose the network of intersecting rows 110, 112 of extrusion slots.

The use of loosely stacked tubes 90 enables the precisely fixtured shaping teeth 94 to center and align each of the tubes 90 when the shank 98 of the teeth 94 is located in the interstices 114 of the tube stack.

In another embodiment of the invention, the entire die including the tubes 90 and the teeth 94 are simultaneously placed on the V-block support 40'. In this case, the wire framework is located on the tube-stacking V-block 40'. The teeth 94 are individually placed in a first row of cells 108a, and the shanks 98 of the teeth 94 are used as interstices spacers in place of the spacer pins 111 as the individual tubes are stacked in a first row in the block 40'. The wire framework 106 and the individual teeth guide the tubes 90 as alternate rows of teeth 94 are aligned with alternate rows of tubes until the die is fully built.

As in the other embodiments, any remaining space between the tubes may be filled with suitable plug material so that the extrudable material flows only through the feed holes 115 in the tubes 90.

The practice of my invention permits the economic manufacture of strong monolith extrusion dies which are readily built by use of individual components to avoid time-consuming machining techniques for forming small holes and slots in a solid steel plate. The assembly techniques result in high strength extrusion dies capable of use under high extrusion pressures capable of forming high density, thin wall honeycomb monoliths.

While my invention has been described in terms of certain preferred embodiments thereof, it will be appreciated that other forms could readily be adapted by one skilled in the art. Accordingly, the scope of my invention is to be considered limited only by the following claims.

The embodiments of the invention in which an exclusive property or privilege is claimed are defined as follows:

1. In an extrusion die for extruding honeycomb structures of the type having feed holes for directing the extrudable material to a plurality of extrusion slots having a cross-sectional shape conforming to the shape of the cell walls of the honeycomb structural body, the improvement comprising:
   a plurality of individual tube elements having an opening therethrough defining feed holes for flow of extrudable material;
   each of said individual tube elements having an external wall segment thereon and said individual tube elements being stacked so that said wall segments are in engagement to provide a reference space therebetween;
   a plurality of individual shaping teeth;
   each of said shaping teeth having a head portion and a shank portion, said shank portion inserted into one of said reference spaces to locate said head portion in spaced relationship with a head portion on another of said shaping teeth to define extrusion slots therebetween arranged in intersecting rows conforming to the shape of the cell walls of the honeycomb structure; and
   means for defining a flow transition path from said feed openings to said extrusion slots for smooth flow of the extrudable material through said extrusion slots so as to shape the extrudable material into the honeycomb structural body as it passes from said feed holes through said extrusion slots.

2. In the extrusion die of claim 1, a spacer element supported between each of said tube elements to locate said external wall segments thereon in spaced parallelism for defining said reference spaces therebetween.

3. In the extrusion die of claim 1, said tube elements being round pipes having circular cross-section feed holes therethrough.

4. In the extrusion die of claim 1, each of said shaping teeth having a head portion with an external surface of square, triangular or hexagonal configuration.

5. In the extrusion die of claim 1, said tube elements being spaced laterally of one another to provide a flow transition path into said intersecting rows of extrusion slot, said transition paths being aligned with a feed hole at all of the points of intersection of said rows of extrusion slots or with a feed hole at alternate ones of said points of intersection or with a feed hole at each intersection of alternate rows of said intersections.

* * * * *